(12) United States Patent
Alvey

(10) Patent No.: US 9,671,271 B1
(45) Date of Patent: Jun. 6, 2017

(54) MEASURING DEVICE

(71) Applicant: Mead Johnson Nutrition Company, Glenview, IL (US)

(72) Inventor: John D. Alvey, Evansville, IN (US)

(73) Assignee: Mead Johnson Nutrition Company, Chicago, IL (US)

( * ) Notice: Subject to any disclaimer, the term of this patent is extended or adjusted under 35 U.S.C. 154(b) by 0 days.

(21) Appl. No.: 15/293,474

(22) Filed: Oct. 14, 2016

(51) Int. Cl.
*G01F 19/00* (2006.01)

(52) U.S. Cl.
CPC .................................. *G01F 19/002* (2013.01)

(58) Field of Classification Search
CPC ........... G01F 19/02; G01F 11/00; G01F 11/10
USPC .................................. 73/426; 222/362, 368
See application file for complete search history.

(56) References Cited

U.S. PATENT DOCUMENTS 3,850,347 A * 11/1974 Hill ..................................... 1/24
2009/0057346 A1 * 3/2009 Jang .................................. 1/46

* cited by examiner

*Primary Examiner* — Jewel V Thompson
(74) *Attorney, Agent, or Firm* — OspreyIP, pllc; James R. Cartiglia; Megan Gustafson

(57) ABSTRACT

The disclosure relates to a measuring device for a granulated product, including a top component comprising a leveling component and a clump-breaking component and a bottom component comprising a scoop and a handle. The measuring device allows a user to remove excess product from the scoop by moving the leveling component along the opening of the scoop. Further, the clump-breaking component serves to break the clump of product that forms in the scoop upon dispensing the product from the measuring device into a receptacle, which may contain a liquid. Breaking the clump of product improves the dissolution of the product into a liquid.

10 Claims, 4 Drawing Sheets

MEASURING DEVICE

TECHNICAL FIELD

The present disclosure relates to a measuring device for measuring a granular product (e.g., powder), such as infant formula. More specifically, the disclosure is directed to a measuring device having a component for leveling the granular product once in the measuring device and having a clump-breaking feature designed to remove clumps from the granular product upon dispensing it from the measuring device.

BACKGROUND

Many products in granular form are sold in containers and can be measured and dispensed from the containers using measuring devices. Such products include infant formula, flour, coffee, sugar and nutritional supplements, such as protein or dietary supplements. Containers holding granulated products may include a measuring device or scoop that allows the consumer to remove the product from the container, and, in certain circumstances, measure and dispense the amount of product needed for each use. However, conventional scoops are not convenient or efficient tools for the consumer or end-user to obtain a level scoop of product.

Many granulated products require precise measuring, which may require the user to level the scoop to remove excess product that is present once the product is scooped from a container. The user may level the scoop with their finger or other utensil, however, this can cause mess and can contaminate the product.

Further, given the cohesive nature of certain granulated products (e.g., powder), after filling the bowl of a measuring device with granulated product, the product may assume the same shape as the measuring device upon being dispensed from the measuring device. This can cause uneven dissolution of the granulated product when placed in liquid. For example, scooping a powder from a container into a measuring device can cause the powder to form a clump in the measuring device. The clump can persist when placed into liquid, preventing even dissolution of the powdered product in the liquid.

Accordingly, there exists the need for a measuring device that is able to provide a level scoop without the user being forced to contaminate their hand or another utensil. Furthermore, there exists the need for a scoop that is able to reduce or remove clumps upon dispensing of the granulated product, such that dissolution of the product is improved.

BRIEF SUMMARY

Disclosed herein is a measuring device including a leveling component designed to level granulated product contents once the product is placed in the scoop of the measuring device. The leveling component can, in some embodiments, be configured to slide away from the opening of the scoop such that the opening of the scoop is not impaired when scooping out granulated product from a container, and then move forward over the scoop to remove any excess product from the opening of the scoop. In some embodiments, the leveling component may reside above the handle of the measuring device when not being used to level the scoop.

In some embodiments, the measuring device includes a clump-breaking component that is designed to remove any clumps from the granulated product as it is dispensed from the scoop of the measuring device. The clump-breaking component can, in some embodiments, be configured to slide from an inactive position not over the opening of the scoop (so as not to impede the opening of the scoop during use) to an active position over the opening of the scoop. In some embodiments the clump-breaking component may reside in a position above the handle of the scoop when not being used.

The leveling component improves the user's experience because it does not require the use of a separate utensil for leveling the scoop (i.e., removing excess product from the opening of the scoop). The leveling component provides a clean and easy way to level the product in the scoop and prevents contamination of the scooped product.

Further, as many granulated products mold into the shape of the scoop used to dispense them, the clump-breaking component helps break the scoop shape, thus resulting in flowing product that dissolves more readily than does a bowl-shaped clump of product (e.g., powder). Accordingly, the measuring device described herein may provide improved nutrient delivery and an improved user experience.

In one aspect, the disclosure relates to a measuring device for a granulated product, including a top component having a leveling component and a tab. The leveling component includes an area having an outer circumference, an inner circumference, and an opening interior to the inner circumference through which granulated product is able to flow as it is dispensed from the measuring device. The measuring device also includes a bottom component comprising a scoop and a handle, wherein the scoop comprises an opening through which the granulated product is dispensed. The top component is capable of moving, relative to the bottom component, from a scooping position in which the leveling component is situated above a portion of the handle adjacent to the scoop, to a dispensing position in which the leveling component is situated above the opening of the scoop, wherein leveling component is capable of removing excess granulated product present at the opening of the scoop when moving from the scooping position to the dispensing position.

In certain embodiments, the handle further comprises an attachment extension attached to the handle and configured to engage the tab of the top component, thereby connecting the top and bottom components. The attachment extension can include a first attachment member extending upward from a first position on the handle and a second attachment member extending upward from a second position on the handle, wherein the second attachment member is situated directly or indirectly across the width of the handle from the first attachment member. In certain embodiments, the first and second attachment members each comprise a groove for engaging the tab.

In certain embodiments, the leveling component includes an opening. The top component can also include a clump-breaking component comprising at least one member situated across the opening of the leveling component, wherein when the leveling component is placed in dispensing position over the scoop, the clump-breaking component is positioned over the opening of the scoop. In certain embodiments, the clump-breaking component comprises at least two members situated across the opening of the leveling component. The two members can be situated at a 90° angle relative to each other In certain embodiments, the clump-breaking component extends upward from and at least partially across the opening of the leveling component. For example, the clump-breaking component can form a cage-like structure situated above the opening of the leveling component and the opening of the scoop when the measuring device is in dispensing position. In certain embodiments, the clump-breaking component includes at least three members extending upward from the leveling component and across the opening of the leveling component.

DETAILED DESCRIPTION

Figure 1:
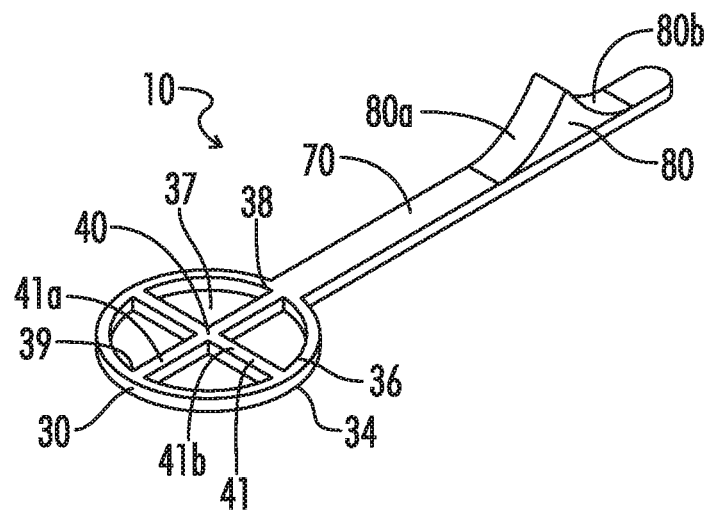
FIG. 1 is a perspective view of the top component of a measuring device.

Reference now will be made in detail to the embodiments of the present disclosure. It will be apparent to those of ordinary skilled in the art that various modifications and variations can be made to the teachings of the present disclosure without departing from the scope of the disclosure. For instance, features illustrated or described as part of one embodiment, can be used with another embodiment to yield a further embodiment.

Thus, it is intended that the present disclosure covers such modifications and variations as come within the scope of the appended claims and their equivalents. Other objects, features and aspects of the present disclosure are disclosed in or are apparent from the following detailed description. It is to be understood by one of ordinary skill in the art that the present disclosure is a description of exemplary embodiments only and is not intended as limiting the broader aspects of the present disclosure.

For the sake of clarity, not all reference numerals are necessarily present in each drawing Figure. In addition, positional terms such as "upper," "lower," "side," "top," "bottom," "vertical," "horizontal," etc. refer to the measuring device when in the orientation shown in the drawings. The skilled artisan will recognize that measuring devices can assume different orientations when in use.

Figure 2:
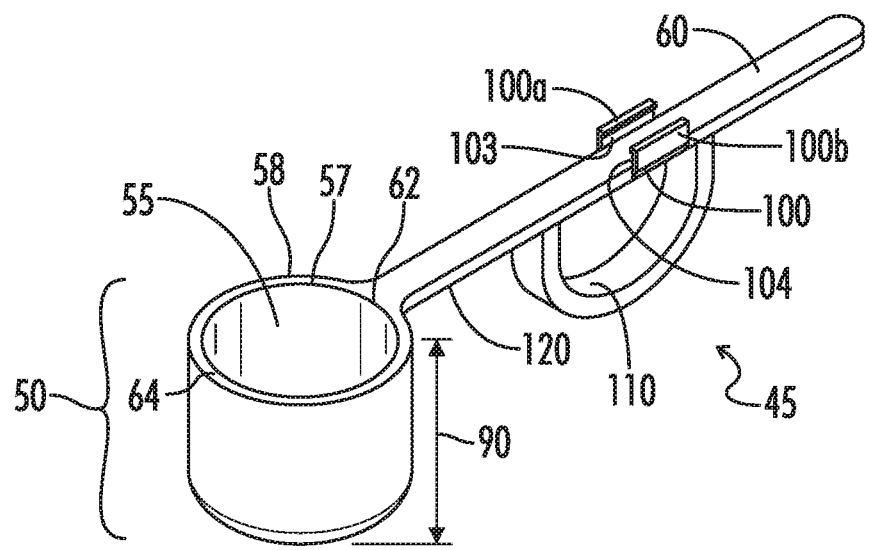
FIG. 2 is a perspective view of the bottom component of a measuring device.

In certain embodiments, a measuring device 5 (e.g., FIGS. 3-5) comprises a top component 10 (FIG. 1) and a bottom component 45 (FIG. 2). As shown in FIG. 1, the top component 10 generally includes a leveling component 30 and a clump-breaking component 40. The bottom component 45 generally includes a scoop 50 and a handle 60. The top component 10 may engage the bottom component 45 to form the measuring device 5, as shown, for example, in FIGS. 3-5.

As shown in FIG. 1, in certain embodiments, the top component 10 comprises a tab 70, a leveling component 30, and a clump-breaking component 40. The leveling component 30 has an outer circumference 34 and an inner circumference 36, with an opening 37 interior to the inner circumference, through which granulated product can flow as it is dispensed from the measuring device. The leveling component 30 has a tab side 38 and an oppositely-facing distal side 39. The leveling component includes a tab 70 connected to the tab side 38 of the leveling component 30. The tab 70 may have the same general dimensions as the handle 60 (see, FIG. 2).

As shown in FIG. 2, the bottom component 45 includes a scoop 50 having an inner circumference 57, an outer circumference 58, an opening 55, and a depth 90. The scoop 50 holds the granular product after the user scoops it from the container. The cross-sectional area of the scoop (and inner 57 and outer 58 circumferences) can be any shape, as long as the shape allows for the scooping of granulated product out of a container. In certain embodiments, the cross-sectional area of the scoop (and inner 57 and out 58 circumferences) is substantially circular. The inner circumference 57 and depth 90 relate to the amount of granular product the scoop 50 is able to hold, which may be adjusted according to the amount of granular product to be dispensed. In certain embodiments, the scoop has a small hole in the bottom of the scoop, wherein the hole is too small for powder to fall out, but it permits air to flow into the scoop as the user is dumping the powder, allowing the powder to flow out.

The scoop 50 has a handle side 62 and an oppositely facing distal side 64. The bottom component 45 has a handle 60 connected to the handle side 62 of the scoop 50. The handle 60 can be used to hold the bottom component 45 or the entire measuring device 5. The handle 60 can be ergonomic for ease in scooping, measuring and dispensing granular product.

Figure 3:
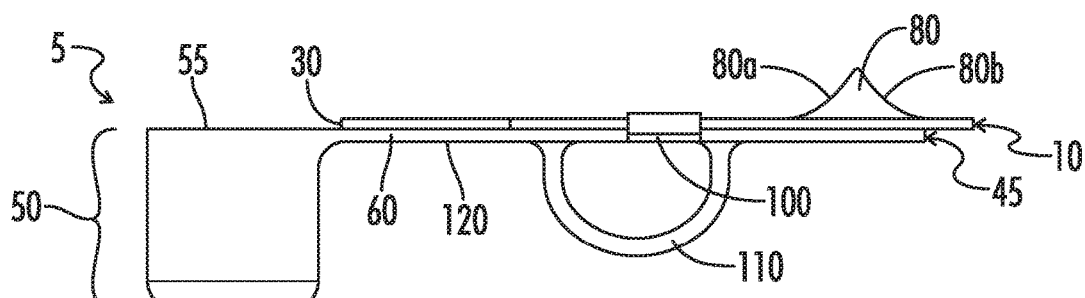
FIG. 3 is a side view of a measuring device formed by the top and bottom components of FIGS. 1 and 2, wherein the measuring device is in scooping position.
Figure 4:
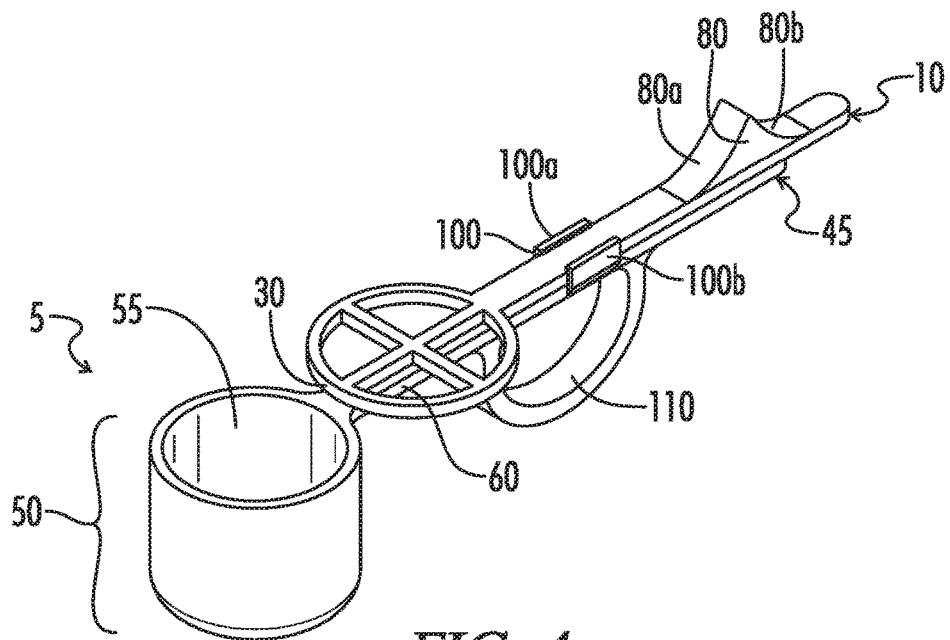
FIG. 4 is a perspective view of the measuring device of FIG. 3 in scooping position.
Figure 5:
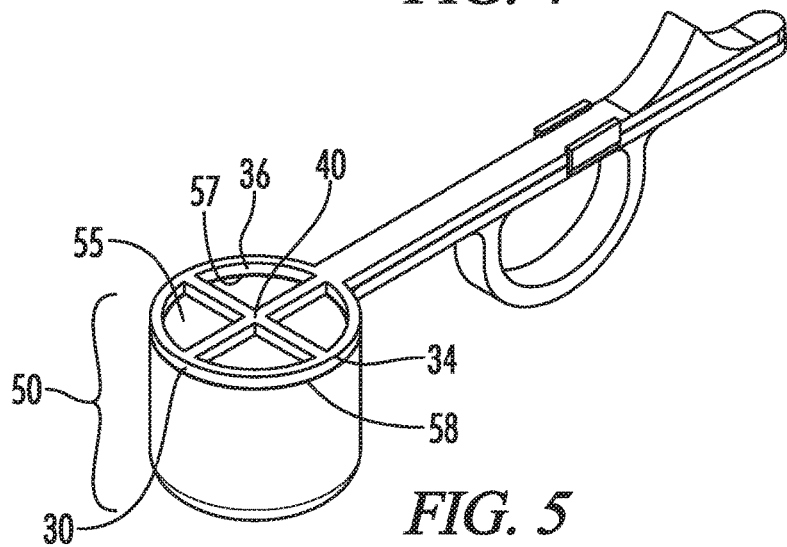
FIG. 5 is a perspective view of the measuring device of FIGS. 3 and 4 in dispensing position.

When a user is in the process of scooping product from a container, the leveling component 30 can rest over the handle 60 of the measuring device 5, adjacent to the scoop 50, such that it does not cover the opening 55 of the scoop 50 (FIGS. 3 and 4). When product has been transferred from the container to the scoop, the user can move (e.g., slide) the leveling component 30 over the opening 55 of the scoop 50 into dispensing position, as shown in FIG. 5, thereby removing any excess granulated product from the opening 55 of the scoop 50. When in dispensing position, the outer circumference 34 of the leveling component 30 is generally above the outer circumference 58 of the scoop 50 and the inner circumference 36 of the leveling component 30 is generally above the inner circumference 57 of the scoop 50. If a clump-breaking component 40 is present, it is also situated above the opening 55 of the scoop 50 (see FIG. 5), such that when the user dispenses the product into a receptacle, the clump-breaking component 40 obstructs any clumps formed by the scoop 50, causing them to break apart as the product falls into the receptacle. Accordingly, the measuring device 5 has a leveling component 30 and a clump-breaking component aimed at increasing efficiency, ease and accuracy of scooping, and measuring and dispensing the granular product.

As shown in FIG. 2, in some embodiments, the handle 60 includes an attachment extension 100 configured to attach the tab 70 of the top component 10 to the bottom component 45. In some embodiments, the attachment extension 100 includes a first attachment member 100a extending upward from a first position on the handle 60 and a second attachment member 100b extending upward from a second position on the handle. In certain embodiments, the second attachment member 100b is situated directly or indirectly across the width of the handle 60 from the first attachment member 100a. The attachment members 100a and 100b may include grooves 103 and 104 for engaging the tab 70 with the bottom component 45.

In certain embodiments, the attachment members 100a and 100b and grooves 103 and 104 are designed to hold the tab 70 of the top component 10 so that the top component 10 can slide along the bottom component 45. In some embodiments, the grooves 103 and 104 act as guides for sliding the top component 10 from a scooping position to a dispensing position.

In some embodiments, the handle 60 optionally includes a finger hold 110 that may be attached separately or integrally molded to the handle and generally extends from the bottom surface 120 of the handle 60. The finger hold 110 may be any protrusion against which a user can place one or more fingers to aid in holding the measuring device 5 steady while engaging the leveling component 30 and clump-breaking component 40. In certain embodiments, the finger hold 110 forms a loop designed for the insertion of the user's finger when using the measuring device 5.

In some embodiments, the tab 70 includes a raised protrusion 80 (see, e.g., FIGS. 1, 3, and 4) designed to assist the user in sliding the top component 10 from a scooping position to a dispensing position. The raised protrusion 80 may be ergonomically designed, having a curve to accommodate the user's finger so that the user can push the top component 10 back and forth, allowing it to slide along the bottom component 45.

In one embodiment, the raised protrusion 80 may include a first curved surface 80a and a second curved surface 80b. The first curved surface 80a can assist the user in engaging the top component 10 and moving (e.g., sliding) the leveling component 30 and clump-breaking component 40 away from the opening 55 of the scoop 50 to a scooping position. After product has been transferred from the container to the scoop, the user can press against the second curved surface 80b to slide the leveling component 30 and clump-breaking component 40 across the opening of the scoop 55 to remove any excess product from the opening of the scoop 55, thereby leveling the scoop. The raised protrusion 80 allows the user to operate the leveling component 30 and the clump-breaking component 40 with one hand.

As shown in FIG. 1, the clump breaking component 40 may comprise at least one member 41 situated across the opening 37 of the leveling component 30. In some embodiments, the clump-breaking component 40 includes at least two members 41a and 41b situated across the opening interior to the inner circumference 36 of the leveling component 30. The member 41 or members (e.g., 41a and 41b) can be in any position over the opening 37 of the leveling component 30, provided that the member or members partially obstructs the opening 37 to allow clumps forming in the scoop break to apart upon contact with the member 41 or members (e.g., 41a and 41b).

In certain embodiments, the at least two members 41a and 41b are situated at a 90° angle relative to each other over the opening 37 of the leveling component 30. In one example, as shown in FIG. 1, one member 41a extends from the tab side 38 of the leveling component 30 to the distal side 39 of the leveling component 30, wherein the two ends of member 41a are attached to the leveling component 30 at its inner circumference 36, and the other member 41b is situated at a 90° angle to member 41a, extending to each lateral side of the leveling component 30, wherein the two ends of member 41b are attached to the leveling component 30 at its inner circumference 36. Accordingly, when the leveling component 30 is placed in dispensing position over the scoop 50, the clump-breaking component 40 and members 41a and 41b are positioned over the opening 55 of the scoop 50.

Figure 6:
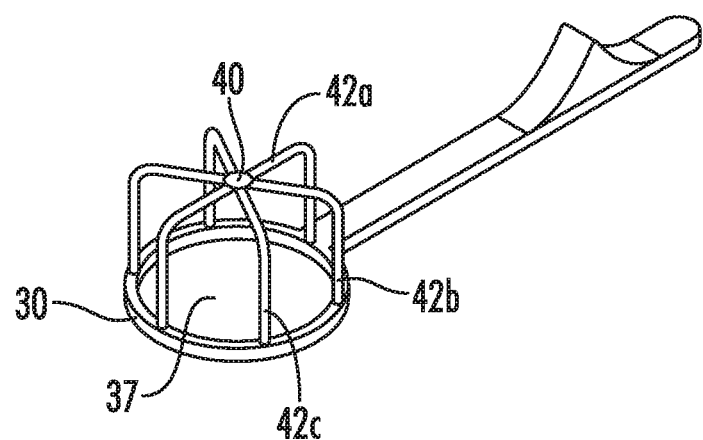
FIG. 6 is a perspective view of a top component of an alternative embodiment of a measuring device.
Figure 7:
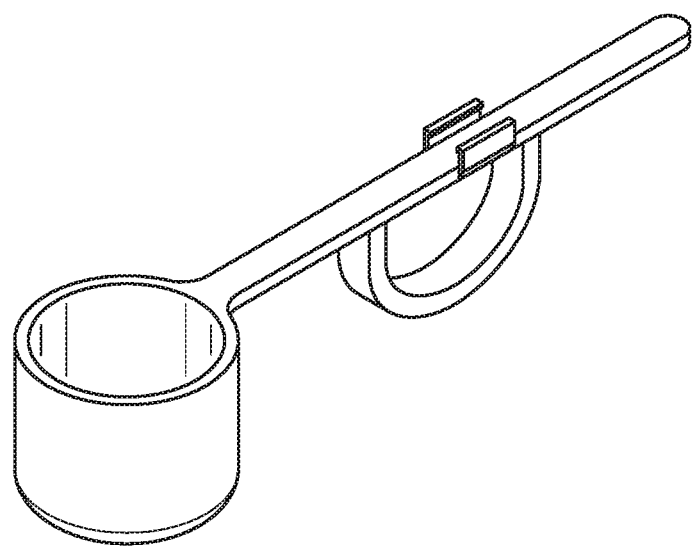
FIG. 7 is a perspective view of a bottom component of an alternative embodiment of a measuring device.

As shown in FIG. 6, in certain embodiments, the clump-breaking component 40 extends upward from and at least partially across the opening 37 of the leveling component 30. When more than one member 41 is used, the clump-breaking component can form a cage-like structure situated above the opening 37 of the leveling component 30 and the opening 55 of the scoop 50 when the measuring device 5 is in dispensing position (see, FIG. 10).

Figure 10:
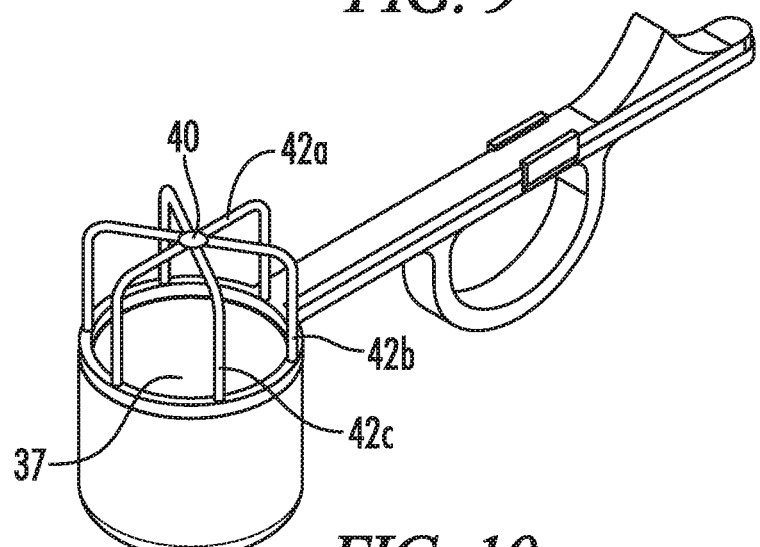
FIG. 10 is a perspective view of the top and bottom components of FIGS. 6 and 7 which together form an alternative embodiment of a measuring device, wherein the measuring device is in dispensing position.

In certain embodiments, the clump-breaking component 40 includes at least three members 42a, 42b, and 42c extending upward from the leveling component 30 and across the opening 37 of the leveling component 30 (and the opening 55 of the scoop 50, when in dispensing position). In certain embodiments, as shown in FIGS. 6 and 10, member 42a extends across the leveling component 30 from the tab side 38 to the distal side 39. Members 42b and 42c also extend across the leveling component 30, wherein members 42a, 42b and 42c are situated radially, spaced evenly apart, with their centers meeting above the center of the leveling component 30.

Figure 8:
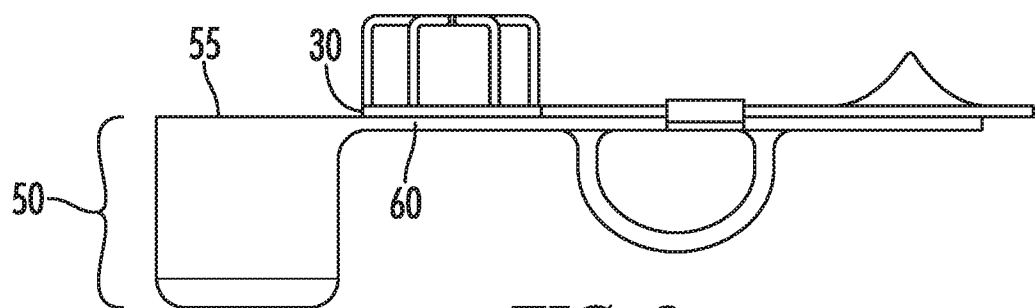
FIG. 8 is a side view of the top and bottom components of FIGS. 6 and 7 which together form an alternative embodiment of a measuring device, wherein the measuring device is in scooping position.
Figure 9:
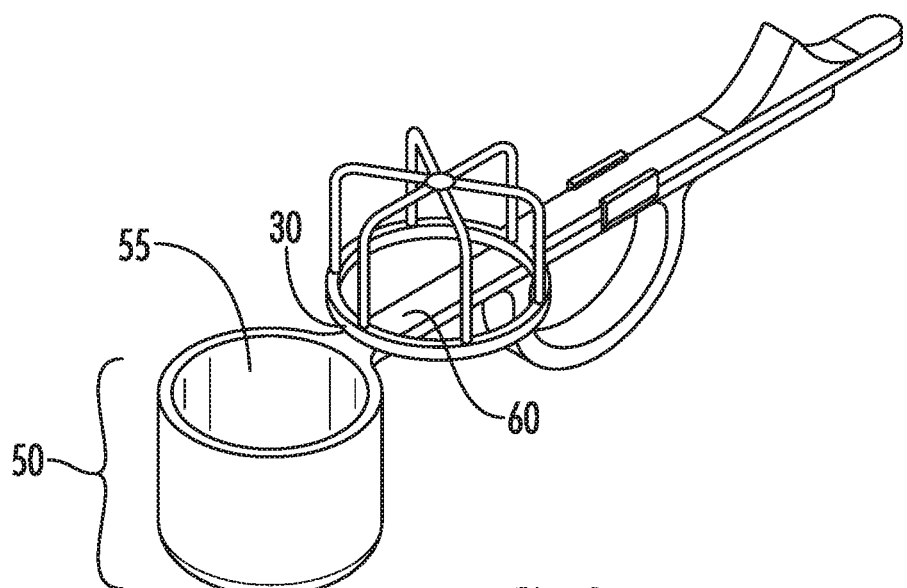
FIG. 9 is a perspective view of the top and bottom components of FIGS. 6 and 7 which together form an alternative embodiment of a measuring device, wherein the measuring device is in scooping position.

As shown in FIGS. 8 and 9, when a user is in the process of scooping product from a container, the leveling component 30 can rest over the handle 60 of the measuring device 5, adjacent to the scoop 50, such that it does not cover the opening 55 of the scoop 50. Alternatively, in certain embodiments, the top component 10 can be removed from the bottom component 45 during the process of scooping. When product has been transferred from the container to the scoop, the user can move (e.g., slide) the leveling component 30 over the opening 55 of the scoop 50 into dispensing position, as shown in FIG. 10, thereby removing any excess granulated product from the opening 55 of the scoop 50.

EXAMPLE

Example 1

A measuring device having a scoop but no clump-breaking component was used to dispense powdered nutritional formula into water. Two out of three times, the powder retained the shape of the scoop when dispensed into the water, with large clumps remaining as the powder sank below the water's surface. The average time from when the powder contacted the water's surface to when all powder sank below the water's surface was 15.7 seconds (n=3).

In contrast, when a measuring device with a clump-breaking component as shown in FIGS. 6-10 was used to dispense powdered nutritional formula from the same lot into water, lumps were broken by passage through the clump-breaking component. The average time from when the powder contacted the water's surface to when all powder sank below the water's surface was 11.5 seconds (n=4), showing that the clump-breaking component was able to break the clump of powder formed by the scoop and promote efficient dissolution of powder into water.

Example 2

A measuring device having a scoop but no clump-breaking component was used to dispense a powdered nutritional formula (different from Example 1) into water. The average time from when the powder contacted the water's surface to when all powder sank below the water's surface was 11.3 seconds (n=3).

In contrast, when a measuring device with a clump-breaking component as shown in FIGS. 6-10 was used to dispense powdered nutritional formula from the same lot into water, lumps were broken by passage through the clump-breaking component. The average time from when the powder contacted the water's surface to when all powder sank below the water's surface was 8.3 seconds (n=3), showing that the clump-breaking component was able to break the clump of powder formed by the scoop and promote efficient dissolution of powder into water.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. Therefore, the spirit and scope of the appended claims should not be limited to the description of the versions contained therein.

Thus, although there have been described particular embodiments of the present invention of a new and useful container and associated measuring device, it is not intended that such references be construed as limitations upon the scope of this invention except as set forth in the following claims.

What is claimed is:

1. A measuring device for a granulated product, comprising:
    a top component comprising a leveling component and a tab, wherein the leveling component comprises an outer circumference, an inner circumference, and an opening interior to the inner circumference through which granulated product flows when dispensed from the measuring device; and
    a bottom component comprising a scoop and a handle, wherein the scoop comprises an opening through which the granulated product is dispensed;
    wherein the top component is capable of moving, relative to the bottom component, from a scooping position in which the leveling component is situated above a portion of the handle adjacent to the scoop, to a dispensing position in which the leveling component is situated above the opening of the scoop, wherein leveling component is capable of removing excess granulated product present at the opening of the scoop when moving from the scooping position to the dispensing position.

2. The measuring device of claim 1, wherein the handle further comprises an attachment extension attached to the handle and configured to engage the tab of the top component, thereby connecting the top and bottom components.

3. The measuring device of claim 2, wherein the attachment extension comprises a first attachment member extending upward from a first position on the handle and a second attachment member extending upward from a second position the handle, wherein the second attachment member is situated directly or indirectly across the width of the handle from the first attachment member.

4. The measuring device of claim 3, wherein the first and second attachment members each comprise a groove for engaging the tab.

5. The measuring device of claim 1, wherein the leveling component comprises an opening and the top component further comprises a clump-breaking component comprising at least one member situated across the opening of the leveling component, wherein when the leveling component is placed in dispensing position over the scoop, the clump-breaking component is positioned over the opening of the scoop.

6. The measuring device of claim 5, wherein the clump-breaking component comprises at least two members situated across the opening of the leveling component.

7. The measuring device of claim 6, wherein the two members are situated at a 90° angle relative to each other.

8. The measuring device of claim 5, wherein the clump-breaking component extends upward from and at least partially across the opening of the leveling component.

9. The measuring device of claim 8, wherein the clump-breaking component forms a cage-like structure situated above the opening of the leveling component and the opening of the scoop when the measuring device is in dispensing position.

10. The measuring device of claim 9, wherein the clump-breaking component includes at least three members extending upward from the leveling component and across the opening of the leveling component.

* * * * *